United States Patent Office 3,032,004
Patented May 1, 1962

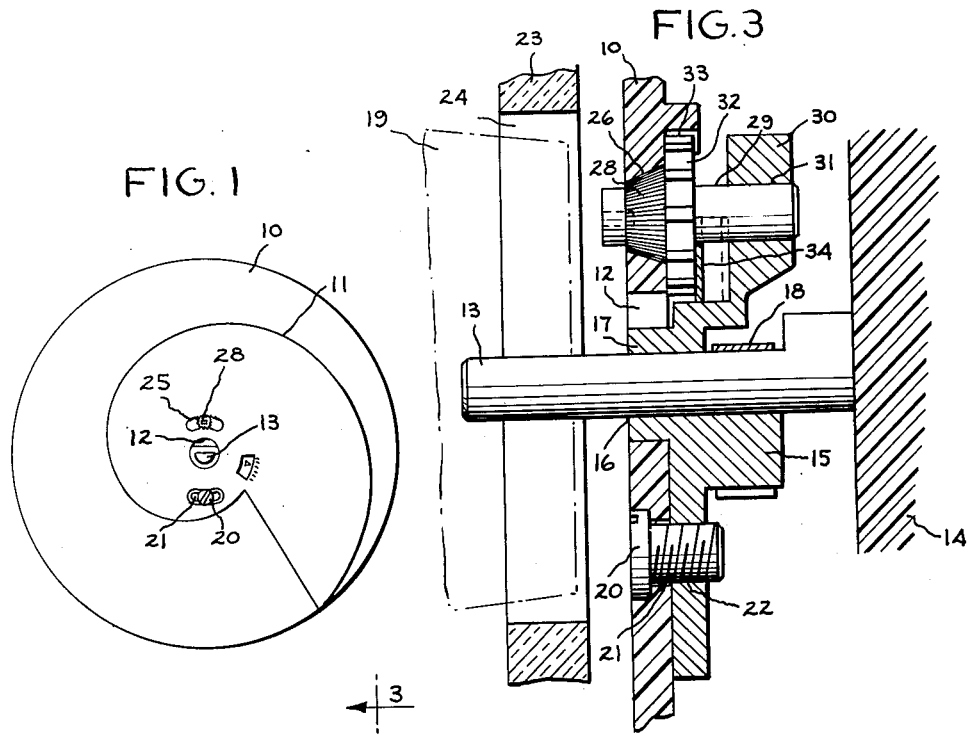
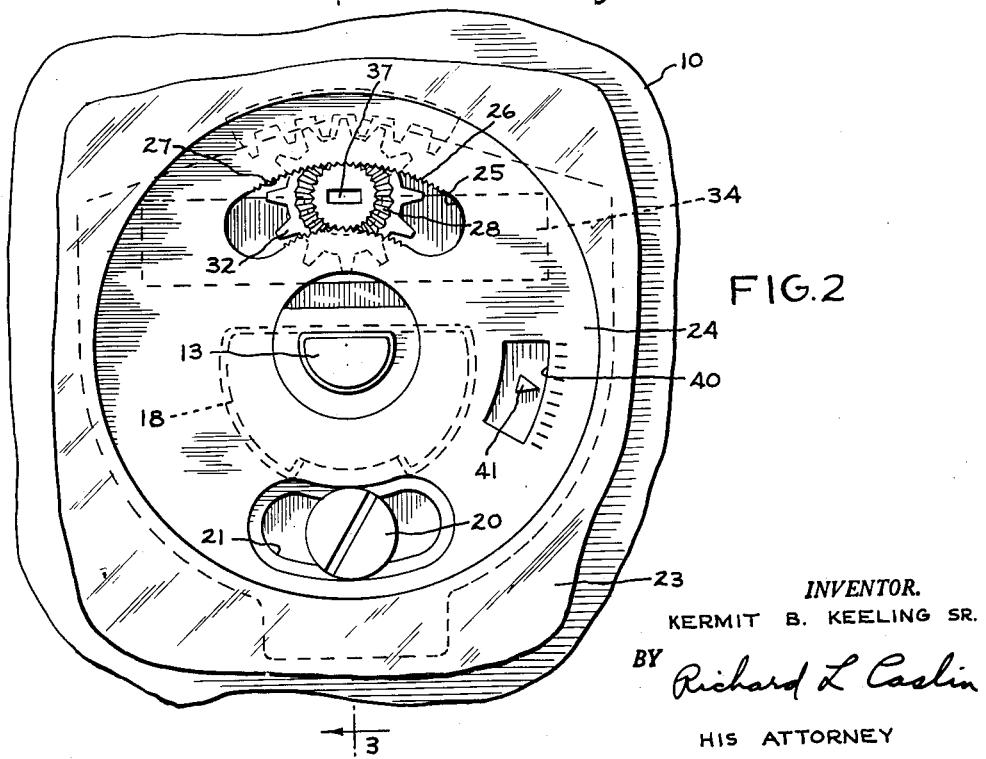

3,032,004
ADJUSTMENT DEVICE BETWEEN A DIAL AND ITS SHAFT
Kermit B. Keeling, Sr., Louisville, Ky., assignor to General Electric Company, a corporation of New York
Filed Apr. 14, 1960, Ser. No. 22,220
8 Claims. (Cl. 116—129)

The present invention relates to an accurate means of adjusting a dial with respect to its supporting shaft and particularly to a means for adjusting a temperature indicating dial to obtain the calibration of a temperature controlling thermostat.

Many thermostats are provided with a control knob which has imprinted thereon a temperature scale. Such thermostats as are used on electric ranges, for instance, are provided with an adjusting means for varying the position of the control knob with respect to the shaft of the thermostat so that the thermostat may be accurately calibrated in the field by a service man to provide accurate temperature control. Usually the knob would include an adjustable plate that could be repositioned with respect to the knob once the knob is removed from the shaft. After this operation the knob would be replaced on the shaft of the thermostat and satisfactory results would be obtainable.

The present invention is not an improvement of the calibrating means for the standard thermostat design but is related to a thermostat having a large temperature indicating dial which cannot be removed from the shaft for calibrating purposes. The problem is how to adjust the dial with respect to the shaft of the thermostat while being limited to working only from the front side of the dial.

The principal object of this invention is to provide a temperature controlling device with an adjustment means between the shaft of the device and a temperature indicating dial where the adjustment device is to be operated from the front side of the dial within very close quarters.

A further object of the present invention is to provide an adjustment means between a dial and its supporting shaft so that the dial may not be turned with respect to the shaft after the proper position of the dial is set and before a positive fastening means is engaged.

A preferred embodiment of the present invention includes a temperature controlling device such as a thermostat that has a manually operable external shaft. A temperature indicating dial is mounted on the shaft by means of a hub member, the hub member being locked against rotational movement with respect to the shaft. An adjustment means is provided between the dial and the hub member for obtaining relative rotational movement between the two parts. This adjustment means includes an arcuate slot formed in the dial and a segment of an internal gear located on the back side of the dial adjacent said slot. A pinion gear is supported for rotational movement from the hub member and is engageable with the before-mentioned internal gear segment. A friction wheel is associated with the pinion gear for engagement with portions of said slot. Preferably, spring means will be provided to normally bias the friction wheel into locking engagement with the slot of the dial whereby the spring must be partially depressed for disengaging the friction wheel from the slot before the pinion gear may be turned to rotate the dial with respect to the hub member which is fixed to the shaft. A second locking means is provided between the dial and its hub member to insure a positive locking action.

My invention will be better understood from the following description taken in connection with the accompanying drawing and its scope will be pointed out in the appended claims.

FIGURE 1 is a front view of a temperature indicating dial that includes the adjustment means of the present invention for obtaining relative rotational movement between this dial and the shaft of a temperature controlling device.

FIGURE 2 is an enlarged fragmentary view of the central portion of the dial of FIGURE 1 looking through a circular opening in a crystal that would normally overlie the dial in the backsplash of an electric range for example.

FIGURE 3 is a cross-sectional elevational view taken through the center of the dial on the line 3—3 of FIGURE 2.

Turning now to a consideration of the drawing and in particular to FIGURE 1, 10 represents a temperature indicating dial in the form of a circular plate of molded plastic material such as styrene or the like. The front side of the dial includes a spiral line 11 that emanates close to the center of the dial and is generated outwardly by a constantly increasing radii. Such a temperature indicating dial is of the type taught in the Schroeder Patent 2,889,800 which is assigned to the same assignee as is the present invention. The center of the dial includes a small circular opening 12 for receiving a shaft 13 of a temperature controlling device or thermostat 14.

It is desirable to be able to adjust the position of the dial 10 with respect to the shaft 13 so that the angular position of the shaft with respect to the inner thermostat mechanism will correspond to the temperature marking signified by the spiral line 11 of the dial 10. This objective is achieved with an adjustment device between the dial and shaft in the form of a hub member 15 with a D-shaped hole 16 for receiving the shaft. The hub member also has a small collar 17 which slips into the central hole 12 of the dial so that the dial is supported from the collar. A spring clip 18 is assembled over the shaft 13 and the back portion of the hub member 15 to provide a frictional force tending to retard the dial from sliding along the shaft. The hub member 15 is a small aluminum die casting or the like which is easy to manufacture at low cost. A locking means in the form of a fastening screw 20 is provided between the dial 10 and hub member 15 for fastening these two parts together. The screw extends through an arcuate slot 21 in the dial and is threadably engaged in a tapped hole 22 of the hub member.

As partially shown in FIGURE 3, a large pane of glass or crystal 23 is positioned in front of the dial 10. This is a typical assembly showing the thermostat as it is being used in present production in the backsplash of an electric range. It is desired that the position of the dial 10 with respect to the shaft 13 may be adjusted from the front of the dial through the large opening 24 in the crystal of about ¾" diameter. A portion of a control knob 19 is shown in phantom lines for mounting on the shaft 13 so that the setting of the thermostat 14 may be adjusted manually. Notice that the locking screw 20 is visible through the opening 24 in the crystal as is best seen in FIGURE 2.

The means for adjusting the position of the dial 10 includes an arcuate slot 25 in the dial 10 that has side walls 26 that are drawn from a center point that coincides with the rotational axis of the shaft 13. These side walls 26 diverge outwardly from the front to the back of the dial as is best seen in FIGURE 3. These inclined walls 26 of the slot are provided with fine teeth 27 as is seen in FIGURE 2 for mating engagement with a bevelled friction wheel 28 that has a knurled surface for mating engagement with the fine teeth 27 of the slot. This friction wheel 28 is assembled on a secondary shaft 29 that is rotatably supported within an arm 30 of the hub member 15. This arm 30 is radially disposed from the shaft and is set back slightly from the back surface of the dial 10. The secondary shaft 29 fits into a close clearance hole 31 for both rotational and sliding engagement therein. This secondary shaft 29 also supports a pinion gear 32 which meshes with a segment of an internal gear 33 that is disposed on the rear surface of the dial 10. A leaf spring 34 as best seen in FIGURES 2 and 3 is captured between the arm 30 of the hub member 15 and the pinion gear 32 for normally biasing the friction wheel 28 into mating or locking engagement with the fine teeth 27 of the slot 25.

To assemble the hub member 15 with the dial 10, the leaf spring 34 is first trapped between the pinion gear 32 and the arm 30 of the hub and the secondary shaft 29 is inserted into the close clearance hole 31. Then the dial 10 is assembled onto the collar 16 of the hub member being careful to direct the friction wheel 28 into the slot 25. Also, the locking screw 20 must be in the proper position to be enserted through the slot 21 and into the tapped opening 22 of the hub member 15.

To adjust the dial 10 it is first necessary to loosen the locking screw 20 so that the head of the screw does not bind in the slot 21 and the dial 10 is capable of moving with respect to the hub member 15 except for the locking engagement between the friction wheel 28 and the fine teeth 27. The next step is to insert a tool such as a small screw driver in the rectangular opening 37 in the front end of the secondary shaft 29 and at the same time press against the shaft to compress the spring 34 and disengage the friction wheel from the fine teeth 27 of the inclined walls 26 of the slot 25. While in this depressed position the secondary shaft 27 should be turned thereby turning the pinion gear 32 and driving the dial 10 by means of the teeth of the internal gear 33. Once the proper setting is reached the tool is released from the secondary shaft 29 and spring 34 normally biases the friction wheel 27 again into interlocking engagement with the side walls of the slot 25. Thus, while the locking screw 20 is being tightened there will be no tendency for the dial 10 to shift out of position.

The dial 10 also includes an arcuate window 40 which overlies a pointer 41 that is made integral with the hub member 15 as is best seen in FIGURE 2 so that an accurate change of adjustment can be viewed with ease.

Modifications of this invention will occur to those skilled in this art and it is to be understood, therefore, that this invention is not limited to the particular embodiment disclosed but that it is intended to cover all modifications which are within the true spirit and scope of this invention as claimed.

What I claim as new and desire to secure by Letters Patent of the United States is:

1. A temperature controlling device having an external shaft, a temperature indicating dial mounted on the shaft by means of a separate hub member, and adjustment means for obtaining relative rotational movement between the dial and the hub member, said means comprising an arcuate slot formed in the dial, a segment of an internal gear located on the back side of the dial adjacent said slot, and a pinion gear supported from the hub member and engageable with said internal gear, said pinion gear having a friction wheel in engagement with portions of said slot, the pinion gear being accessible through the said arcuate slot for adjustment of the dial, and locking means between the dial and hub member for fastening these two parts together.

2. A temperature controlling device as recited in claim 1 wherein the arcuate slot has opposite walls that diverge from the front surface to the back surface of the disk, the said friction wheel of the pinion gear being of bevelled shape for making engagement with the inclined walls of the slot, and spring means normally biasing the friction wheel into mating engagement with the inclined walls of the slot.

3. A temperature controlling device as recited in claim 1 wherein the pinion gear and friction wheel are arranged on a secondary shaft that is in both sliding and rotational engagement with the hub member, and spring means normally biasing the friction wheel into engagement with portions of said slot so as to prevent movement of the dial with respect to the hub member until the friction wheel is disengaged from the slot so that the pinion gear may be turned to drive the dial into a new position with relation to the hub member.

4. A temperature controlling device as recited within claim 3 wherein the secondary shaft and the locking means between the dial and the hub member are closely associated adjacent the shaft of the temperature controlling device so that only a small axial opening is necessary for adjusting the position of the dial with respect to the main shaft.

5. A temperature controlling thermostat having a manually operated external shaft, a temperature indicating dial mounted on the shaft by means of a hub member arranged on the back side thereof, and adjustment means to affect relative rotational movement between the dial and the hub member for calibrating the thermostat and obtaining accurate temperature readings, said adjustment means comprising an arcuate slot formed in the dial and a segment of an internal gear located on the back side of the dial adjacent said slot, a pinion gear carried by the hub member and capable of meshing with the internal gear of the dial, the pinion gear having a shaft with a bevelled friction wheel for mating engagement with the side walls of the slot, and means for engaging the friction wheel from the front of the dial for turning the pinion gear thereby shifting the position of the dial with respect to the hub member.

6. A temperature controlling thermostat as recited in claim 5 with the addition of spring means normally biasing the friction wheel into locking engagement with the slot of the dial, whereby the dial may not be moved until the spring is partially depressed and the friction wheel is disengaged from the slot so that the pinion gear may be turned.

7. A temperature controlling thermostat as recited in claim 6 with the addition of a positive locking means between the dial and the hub member for fastening these two parts together.

8. A temperature controlling device having an external shaft, a temperature indicating dial mounted on the shaft by means of a hub member, said hub member including a collar that slips into a central hole in the dial so that the dial is capable of turning about this collar, a fastening screw extending through an opening in the dial and into threaded engagement with the hub member for fastening these two parts together, said hub member including a radially extending arm that is spaced from the dial, said arm supporting a secondary shaft that contains a pinion gear and a bevelled friction wheel, the dial having an arcuate slot with side walls for mating engagement with the bevelled friction wheel, the back side of the dial having a segment of an internal gear for meshing with the pinion gear, and spring means normally biasing the friction wheel into locking engagement with the arcuate slot, whereby the dial may be adjusted from the front with respect to the main shaft by first unlocking the fastening screw and then depressing the spring so that the friction wheel is disengaged from the slot before turning the pinion gear and driving the dial to turn about the main shaft.

References Cited in the file of this patent

UNITED STATES PATENTS

| | | |
|---|---|---|
| 1,063,342 | Ekman | June 3, 1913 |
| 2,019,132 | Hansen | Oct. 29, 1935 |
| 2,237,653 | Chatillon | Apr. 8, 1941 |